United States Patent [19]

Sueda et al.

[11] 4,148,790
[45] Apr. 10, 1979

[54] METALLIZED TRIAZINE REACTIVE DYES

[75] Inventors: Yoshihisa Sueda, Toyonaka; Suketsugu Koumura, Ibaragi; Kazuyoshi Hirabayashi, Ikeda; Hirohito Kenmochi, Takatsuki; Hisashige Terao, Toyonaka; Yoshio Mori, Ibaragi, all of Japan

[73] Assignee: Sumitomo Chemical Company Limited, Osaka, Japan

[21] Appl. No.: 788,444

[22] Filed: Apr. 18, 1977

Related U.S. Application Data

[62] Division of Ser. No. 471,986, May 21, 1974, Pat. No. 4,038,267.

[30] Foreign Application Priority Data

May 24, 1973 [JP] Japan .................................. 48-58829

[51] Int. Cl.² .................. C09B 45/48; C09B 62/08
[52] U.S. Cl. .................................. 260/146 T; 260/147
[58] Field of Search ................ 260/146 T, 147, 145 C

[56] References Cited

U.S. PATENT DOCUMENTS

| 3,646,002 | 2/1972 | Andrew et al. ................. 260/147 X |
| 3,826,799 | 7/1974 | Waring ............................ 260/146 T |

*Primary Examiner*—Charles F. Warren
*Attorney, Agent, or Firm*—Stevens, Davis, Miller & Mosher

[57] ABSTRACT

A dye, which is suitable for dyeing cellulosic fiber materials, of the formula,

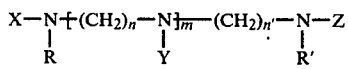

wherein R and R' are each hydrogen, a $C_1$-$C_4$ alkyl, or $C_1$-$C_4$ hydroxyalkyl, m is an integer of 1 to 6, n and n' are each an integer of 2 to 4, and when m is 2 or more, n may be the same or different integer between 2 and 4, X is hydrogen or a group of the formula

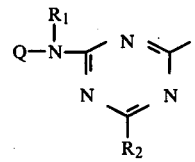

(wherein Q is a dye residue, $R_1$ is hydrogen or a $C_1$-$C_4$ alkyl and $R_2$ is halogen); Y is hydrogen or a group of the formula

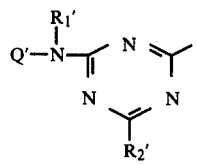

(wherein Q' is a dye residue, and when m is 2 or more, Q's may be the same or different, $R_1'$ is hydrogen or a $C_1$-$C_4$ alkyl and $R_2'$ is halogen); Z is hydrogen or a group of the formula

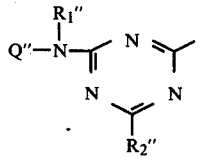

(wherein Q" is a dye residue, $R_1''$ is hydrogen or a $C_1$-$C_4$ alkyl and $R_2''$ is halogen, Q, Q' and Q" may independently be the same or different and X, Y and Z are not hydrogen at the same time).

6 Claims, No Drawings

METALLIZED TRIAZINE REACTIVE DYES

This is Division of application Ser. No. 471,986 filed May 21, 1974, now U.S. Pat. No. 4,038,267.

The present invention relates to a new reactive dye, preparation thereof and dyeing method including use of the dye.

In the field of dyeing and printing lately, an environmental pollution has also attracted great interest as in other fields, and particularly decoloration of dyeing waste water has become a serious problem. There have been developed many decoloration techniques of dyeing waste water, however it is obvious that a basic solution to this problem is to develop a dye and dyeing method free from the waste water problem.

Particularly in dyeing of cellulosic fiber materials using the conventional reactive dyes, the decoloration is very difficult, because the dyes are hydrolyzed in the course of dyeing and go into waste water in a large amount without being fixed to the materials to be dyed. The difficulty, however, can be solved by an increase in fixing ratio of dye to the materials, which also directly leads to cost reduction in dyeing.

The present inventors, as a result of the study based on the situation above mentioned, have discovered a new reactive dye which has an extremely high fixing ratio compared with the conventional reactive dyes, thus having a much smaller proportion of the unreacted and hydrolyzed portions discharged into the dyeing waste water. The present inventors, furthermore, have discovered that the new dyes can give an excellent colour depth compared with the conventional reactive dyes.

The new reactive dyes of the present invention can be represented by the following general formula (I),

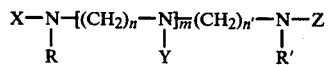

wherein R and R' are each hydrogen, a $C_1$-$C_4$ alkyl, or $C_1$-$C_4$ hydroxyalkyl, m is an integer of 1 to 6, n and n' are each an integer of 2 to 4, and when m is 2 or more, n may be the same or different integer between 2 and 4, X is hydrogen or a group of the formula

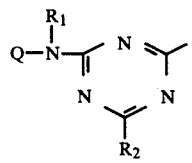

(wherein Q is a dye residue, $R_1$ is hydrogen or a $C_1$-$C_4$ alkyl and $R_2$ is halogen); Y is hydrogen or a group of the formula

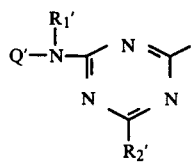

(wherein Q' is a dye residue, and when m is 2 or more, Q's may be the same or different, $R_1'$ is hydrogen or a $C_1$-$C_4$ alkyl and $R_2'$ is halogen); Z is hydrogen or a group of the formula

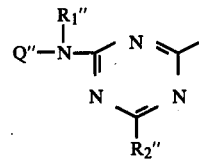

(wherein Q" is a dye residue, $R_1''$ is hydrogen or a $C_1$-$C_4$ alkyl and $R_2''$ is halogen Q, Q' and Q" may independently be the same or different and X, Y and Z are not hydrogen at the same time.).

In the present invention, the dye residue represented by Q, Q' or Q" is a residue of the general formula represented by the following free acid forms;

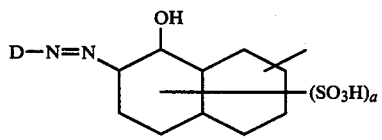

wherein D is a diazo-component of benzene or naphthalene series which may contain an azo group, and a is 1 or 2,

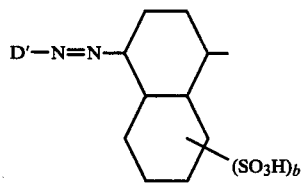

wherein D' is a diazo-component of benzene or naphthalene series which may contain an azo group, and b is 0 or 1,

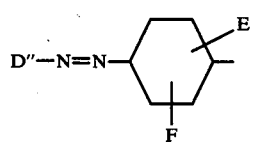

wherein D" is a diazo-component of benzene of naphthalene series which may contain an azo group, E is hydrogen, a halogen, methyl, methoxy or ethoxy, and F is hydrogen, methyl, methoxy, ethoxy or a group of the formula

in which $R_3$ is hydrogen or a $C_1$-$C_4$ alkyl, and G is a $C_2$-$C_5$ aliphatic acyl, $C_1$-$C_4$ alkylsulfonyl or carbamoyl,

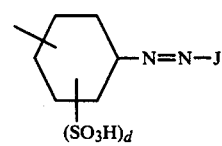

wherein J is a coupling-component of benzene, naphthalene or pyrazolone series, and d is 0, 1 or 2,

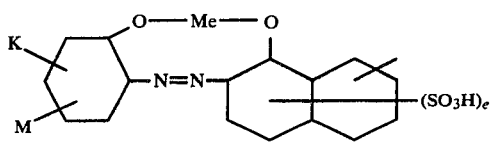

wherein Me is a metallic atom of copper, chromium or cobalt, K and M are each hydrogen, a halogen, methyl, methoxy, ethoxy, carboxyl, sulfo or aryl azo group, and e is 1 or 2,

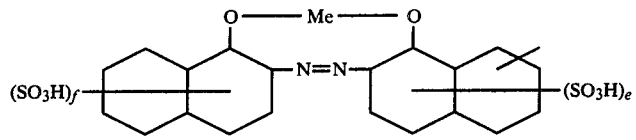

wherein Me and e are the same as defined above, f is an integer of 1 to 3,

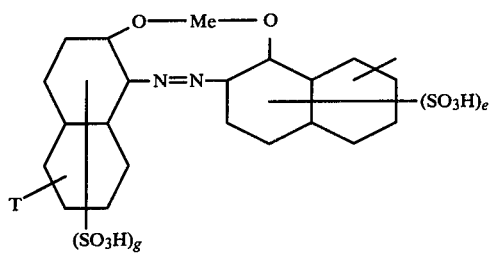

wherein Me and e are the same as defined above, T is hydrogen, a halogen or nitro, and g is 0, 1 or 2,

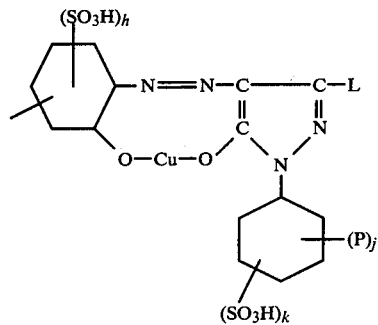

wherein L is methyl, carboxyl, a $C_2$–$C_5$ carboalkoxy or carbamide, P is a halogen, methyl, sulfonic acid or sulfonamide, and h, k and j are each 0, 1 or 2,

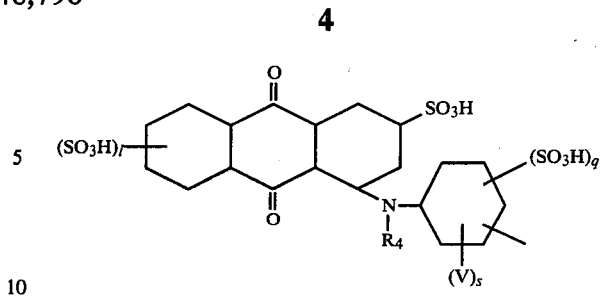

wherein $R_4$ is hydrogen or a $C_1$–$C_4$ alkyl, V is a halogen or methyl, l and g are each 0, 1 or 2 and s is 0, 1, or 3,

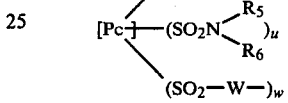

wherein Pc is phthalocyanine which may be substituted with a halogen, $R_5$ and $R_6$ are each hydrogen or a $C_1$–$C_4$ alkyl, W is phenylene which may be substituted or a $C_2$–$C_4$ alkylene, t is 1, 2 or 3, u is 0, 1 or 2, and w is 1 or 2; and t, u and w are related to one another by the following equation, $$2 \leq t + u + w \leq 4$$

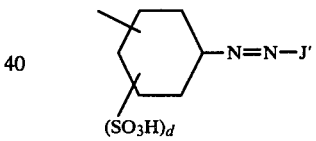

wherein J' is a coupling component of pyrazolone series, and d is the same as defined above, and

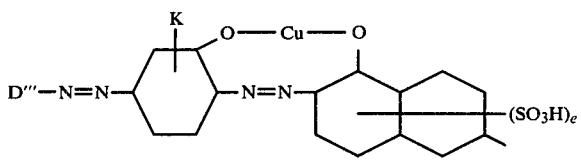

wherein D''' is a diazo component of benzene and naphthalene series, and K and e are same as defined above.

The new reactive dyes of the present invention can be prepared by the following processes, that is, by reacting 2,4,6-trihalogeno-1,3,5-triazine, with an amine represented by the formula (II),

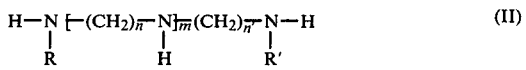

wherein R, R', m, n and n' are the same as defined above, and at least one dye of the formula (III), (IV) or (V), which dye has an amino group which can be acylated,

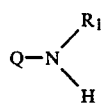
(III)

(wherein Q and $R_1$ are the same as defined above,)

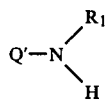
(IV)

(wherein Q' and $R_1'$ are the same as defined above,)

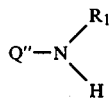
(V)

(wherein Q" and $R_1"$ are the same as defined above,) in arbitrary order.

More specifically, the new reactive dyes of the present invention can be obtained by condensing a cyanuric halide, at 0 to 10° C. preferably in an aqueous medium, with at least one dye of the formula represented by a free acid form,

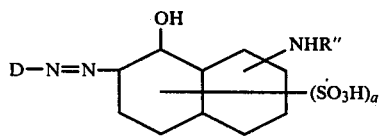
(2)

wherein R" is hydrogen, a $C_1$-$C_4$ alkyl or $C_1$-$C_4$ hydroxyalkyl, D and a are the same as defined above,

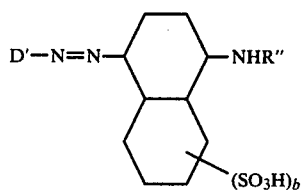
(3)

wherein R", D' and b are the same as defined above,

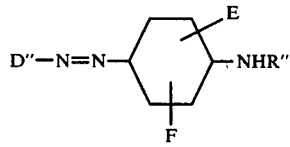
(4)

wherein R", D", E and F are the same as defined above,

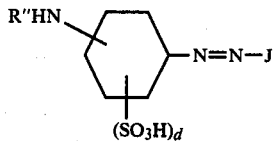
(5)

wherein R", J and d are same as defined above,

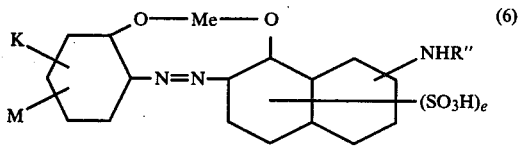
(6)

wherein R", K, M, Me and e are the same as defined above,

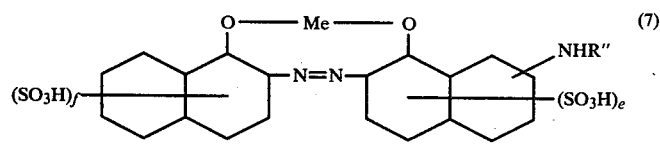
(7)

wherein R", Me, o and f are the same as defined above,

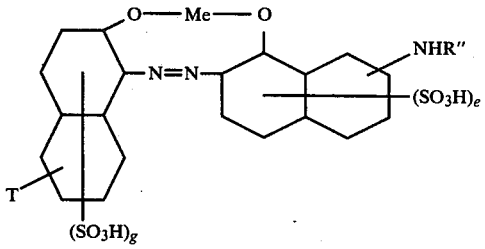
(8)

wherein R", Me, T, e and g are the same as defined above,

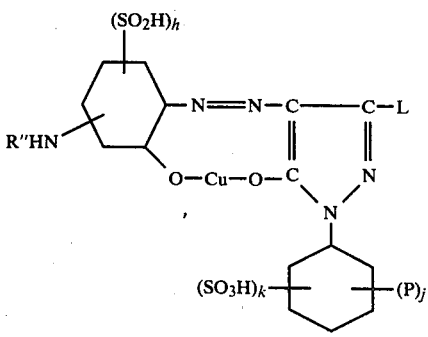
(9)

wherein R", L, P, h, k and j are the same as defined above,

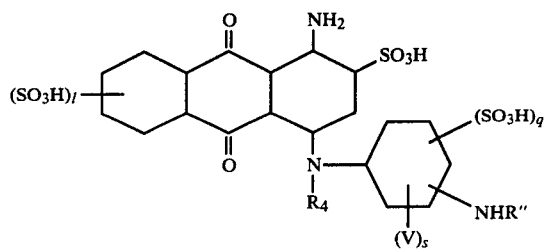  (10)

wherein R″, R4, V, l, g and s are the same as defined above,

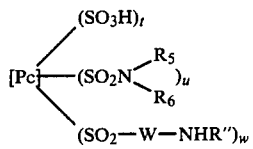  (11)

wherein R″, Pc, R5, R6, W, t, u and w are the same as defined above, and then further condensing the resulting compounds, at 20 to 60° C. preferably in an aqueous medium and in a range of pH between 3 and 7, with $1/m+2\sim1$ by molar ratio of the amine represented by the formula (II).

Alternatively, the new reactive dyes of the present invention can be obtained by first condensing cyanuric halide with $1/m+2\sim1$ by molar ratio of the amine of the formula (II) at 0 to 5° C., preferably in an aqueous medium and in a range of pH between 3 and 7, and then condensing the resulting compounds, at 20 to 60° C. preferably in an aqueous medium, with at least one dye of the formula (III), (IV) or (V) preferably with dyes represented by the formulas (2) to (11).

For particularly brilliant green dyes, it is particularly preferred to combine the dyes of the general formula (13),

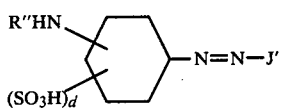  (13)

wherein J′ is a coupling - component residue of pyrazolone series, and R″ and d are the same as defined above, with the dyes of the general formula (11).

In addition, for preparing black dyes, it is paritcularly preferred to combine a mixture of the dye of the formula (14),

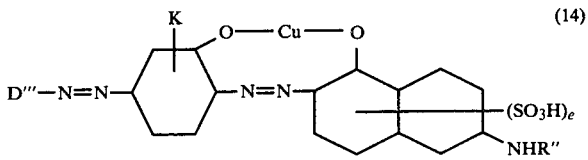  (14)

wherein D‴ is diazo - component residue of henzene or naphthalene series, and K, e and R″ are the same as defined above, and the aforesaid dye (2), with the aforesaid dye (4) or (13).

The reactive dye of the formula (I) can also be prepared by reacting the amine represented by the formula (II), with at least one compound of the general formula,

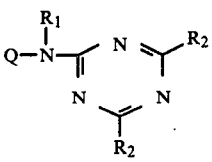

wherein Q, $R_1$ and $R_2$ are the same as defined above,

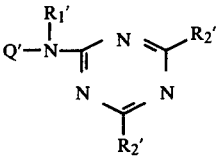

wherein Q′, $R_1'$ and $R_2'$ are the same as defined above,

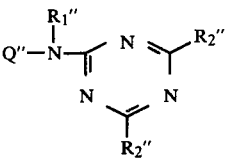

wherein Q″, $R_1''$ and $R_2'$ are the same as defined above.

The dye of the formula (I) in which Q, Q′ and Q″ are each an azoic dye residue can be prepared by diazotising a compound of the general formula,

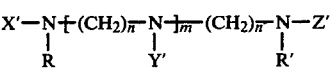

wherein R, R′, m, n and n′ are the same as defined above, X′ is hydrogen, or a group of the formula

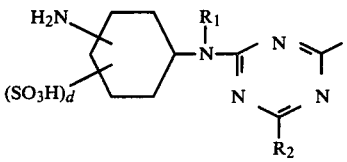

or

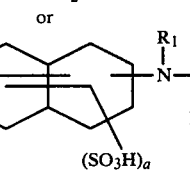

in which $R_1$ and $R_2$ are the same as defined above, and a and d are the same as defined above, Y′ is hydrogen, or a group of the formula

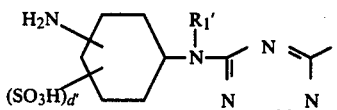

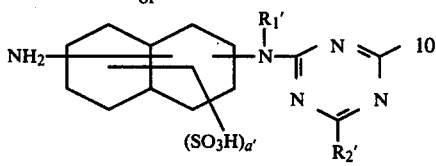

in which $R_1'$ and $R_2'$ are the same as defined above, a' is 1 or 2 and d' is 0, 1 or 2, and Z' is hydrogen or a group of the formula

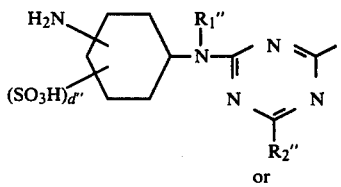

or

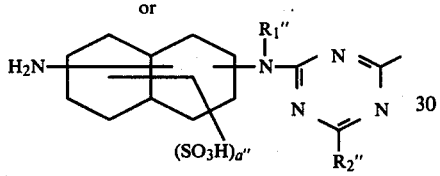

in which $R_1''$ and $R_2''$ are the same as defined above, a'' is 1 or 2 and d'' is 0, 1 or 2, and then by coupling the resulting diazotised compound with a coupling component of the general formula, wherein J is the same as defined above.

Moreover, the dye of the formula (I) in which Q, Q' and Q'' are each an azoic dye residue can be prepared by coupling a compound of the general formula,

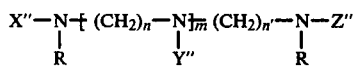

wherein R, m, n and n' are the same as defined above, X'' is hydrogen or a group of the formula

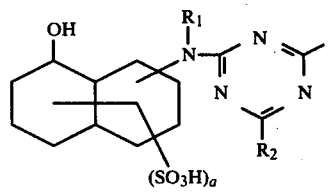

in which $R_1$, $R_2$ and a are the same as defined above, Y'' is hydrogen or a group of the formula

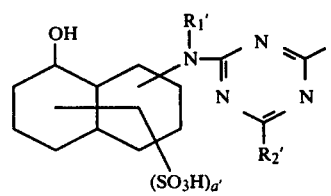

in which $R_1'$, $R_2'$ and a' are same as defined above, and Z'' is hydrogen or a group of the formula

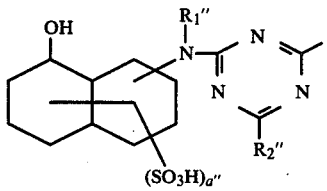

in which $R_1''$, $R_2''$ and a'' are the same as defined above, with the diazotized product of the amine represented by the formula,

D—$NH_2$ wherein D is same as defined above.

More concretely speaking, when aimed dyes are azoic dyes or metal - containing azoic dyes which have a fiber - reactive group in a diazo - component, they can also be prepared by the following process, that is, by the process including first condensing cyanuric halide, at 0 to 10° C. preferably in an aqueous medium, with a compound of the formula represented by a free acid form,

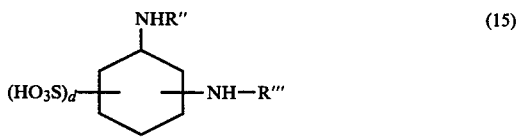   (15)

wherein d and R'' are the same as defined above, and R''' is hydrogen, a $C_2$-$C_5$ aliphatic acyl, aromatic of benzene series acyl or $C_1$-$C_4$ alkylsulfonyl, or a compound of the formula represented by a free acid form,

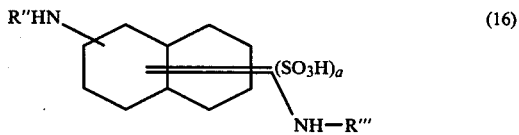   (16)

wherein a, R'' and R''' are the same as defined above, and a relative position of —NHR'' and —NH—R''' groups on a naphthalene nucleus is 1–4, 1–5 or 2–6, condensing the resulting compounds with 1/m+2∼1 by molar ratio of the amine (II) at 20 to 60° C. preferably in an aqueous medium and in a range of pH between 3 and 7, and then, if necessary, hydrolyzing an acyl group by a well - known method followed by diazotization and coupling.

Alternatively, the aimed dyes can be prepared by first condensing cyanuric halide with 1/m+2∼1 by molar ratio of an amine of the formula (II) at 0 to 5° C. preferably in an aqueous medium and in a range of pH between 3 and 7, condensing the resulting compound with the compound of the formula (15) or (16) at 20 to 60° C. preferably in an aqueous medium, and then, if necessary, hydrolyzing an acyl group by a well-known method followed by diazotization and coupling.

When the aimed dyes are azoic dyes or metal-containing azoic dyes which have a fiber-reactive group in a coupling-component, the dyes can be prepared by first condensing cyanuric halide with a compounds of the formula (17) represented by a free acid form,

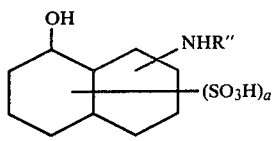 (17)

wherein a and R'' are same as defined above, at 0° to 10° C. preferably in an aqueous medium, condensing the resulting compound with 1/m+2~1 by molar ratio of an amine of formula (II) at 20° to 60° C. preferably in an aqueous medium and in a range of pH between 3 and 7, and then coupling with a diazo-component by a well-known method.

Alternatively, the aimed dyes can be prepared by first condensing cyanuric halide with 1/m+2~1 by molar ratio of an amine of the formula (II) at 0° to 5° C. preferably in an aqueous medium and in a range of pH between 3 and 7, condensing the resulting compound with a compound of the formula (17) at 20° to 60° C., and then coupling with a diazo-component by a well-known method.

With part of metal-containing azoic dyes, aimed dyes can be obtained by first preparing metal-free dyes according to the processes above mentioned and then carrying out an oxidative metallizing treatment.

The amine represented by the formula (II) include diethylenetriamine, dipropylenetriamine, triethylenetetramine, mono-N-($\beta$-aminoethyl)-dipropylenetriamine, tetraethylenepentamine, pentaethylenehexamine, hexaethyleneheptamine, N,N'-dimethyldiethylenetriamine, N,N'-bis($\gamma$-aminopropyl)-butylenediamine, mono-N,-($\beta$-hydroxyethyl)-diethylenetriamine and so forth. The cyanuric halide used in the present invention includes cyanuric chloride and cyanuric bromide.

Coloration of cellulosic textile materials with the present dyes of the formula (I) alone or combination thereof can be carried out by dyeing or printing the materials in the presence of an acid-binding agent, thus giving deep dyeings.

For this purpose, the following methods are often used.

The first is the so-called dip dyeing process including impregnating the fiber materials in a dilute aqueous medium containing an acid-binding agent and a dye. In this case the agent can be added before or after or at the same time with the addition of dye.

The second is a padding process including treating the fiber materials with an acid-binding agent in an aqueous medium before or after or at the same time with impregnating of the materials with a dye liquor. In addition, another method is a printing process in which the fiber materials are printed with a printing paste containing a dye and an acid-binding agent, or the materials are treated with an aqueous acid-binding agent solution before or after printing with a dye-containing printing paste.

The acid-binding agents used for the various dyeing or printing processes include caustic alkali such as caustic soda and caustic potash, magnesium oxide, and alkali metal salts of weak acid such as potassium carbonate, sodium carbonate, sodium bicarbonate, potassium bicarbonate, trisodium phosphate and sodium silicate.

In coloration of textile materials by a dipping process, the amount of acid-binding agent used is advantageously 0.1 to 0.3% based on the total amount when caustic alkalis are used, and 1.0 to 5% based on the total amount when alkali metal salts are used. And the coloration is carried out by keeping the materials in an aqueous dilute medium containing a dye and such the acid-binding agent at above 50° C., preferably at from 70° C. to a boiling point of the solution, for a definite period of time, and then rinsing followed by soaping in a dilute detergent solution, rinsing and drying.

In this case, the acid-binding agent may be added after the dye liquor containing the textile materials and the dye has been heated to above 50° C., more preferably to from 70° C. to a boiling point of the liquor.

The dye liquor may advantageously contain other electrolytes, for example alkali metal salts such as sodium sulfate and sodium chloride, in order to accelerate the exhaustion of dye liquor.

For the padding process of the textile materials, the coloration can be achieved by padding the materials through a dye liquor containing an acid-binding agent, fixing the dye by a short-period steaming or by aging at room temperature, and the rinsing and drying. Alternatively, the materials, after padded through the dye liquor and then dried, may be impregnated in a cooled solution containing the acid-binding agent, immediately steamed under a saturated steam of 95 to 102° C. followed by steaming under an over-heated steam of 95° to 102° C., or 140° to 160° C.

The aqueous medium in which a dye is applied to textile materials may contain other materials such as sodium sulfate, sodium chloride, sodium alginate, water-soluble alkyl ethers of cellulose and urea.

For the treatment of impregnated textile materials with an acid-binding agent in an aqueous medium, the materials after drying are dipped in an acid-binding agent solution at, particularly, a temperature between room temperature and a boiling point of the solution. The dipping time varies with the treating conditions and dyes used, however a period of about 1 minute is generally sufficient when caustic alkali is used at about 100° C. The materials, after treated in the acid-binding agent solution, are rinsed treated with a dilute solution of as weak acid as possible, for example a dilute acetic acid solution, to neutralize the remaining acid-binding agent, rinsed again and dried.

The aqueous solution of acid-binding agent may advantageously contain other materials, particularly electrolytes for example alkali metal salts such as sodium sulfate and sodium chloride, however the acid-binding agent itself is suitably a caustic alkali solution containing sodium chloride in a large amount.

Superiority in the fixing ratio of the dyes of the present invention over the conventional monochlorotriazine type reactive dyes will be shown in the following table.

| Dye used | Dyeing concentration | Fixing ratio[1] (unmercerized cotton yarn |
|---|---|---|
| Present dye (I) | 4% o.w.f. | 85.6% |
| Well-known dye (VI) | " | 43.3% |
| Present dye (II) | " | 80.5% |
| Well-known dye (VII) | " | 50.3% |
| Present dye (III) | " | 67.0% |
| Well-known dye (VIII) | " | 45.2% |
| Present dye (IV) | " | 70.6% |
| Well-known dye (IX) | " | 39.8% |
| Present dye (V) | " | 68.0% |

| Dye used | Dyeing concentration | Fixing ratio[1] (unmercerized cotton yarn) |
|---|---|---|
| Well-known dye (X) | " | 46.6% |

Note

[1] Fixing ratio (%) = (absorbance of the dye fixed on the yarn) / (absorbance of the dye used for dyeing the yarn) × 100

(The dye used and the dye fixed on the yarn were respectively dissolved in 80% $H_2SO_4$, and each solution was measured by an absorptiometric method.)

The structural components of the present dyes mentioned above are as follows.

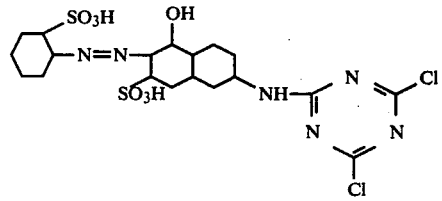
(I)

(1 mole), diethylenetriamine (⅔ mole)

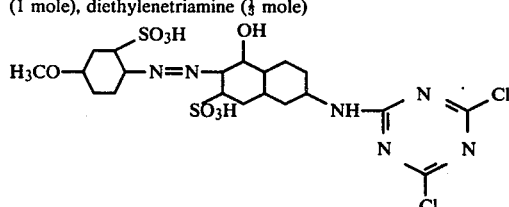
(II)

(1 mole), diethylenetriamine (⅔ mole)

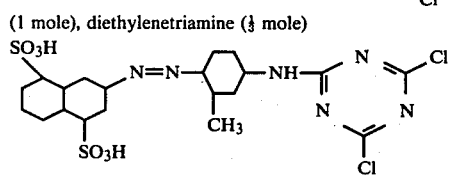
(III)

(1 mole), diethylenetriamine (½ mole)

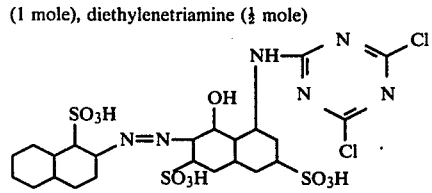
(IV)

(1 mole), diethylenetriamine (½ mole)

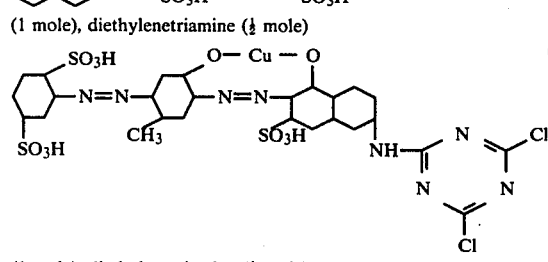
(V)

(1 mole), diethylenetriamine (½ mole)

The well-known dyes as a reference are described in the following patents.

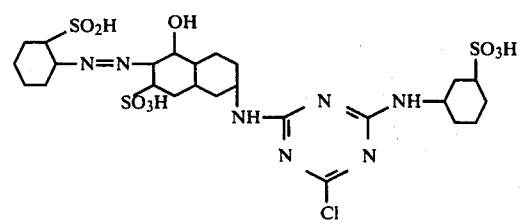
(VI)

Corresponding to I; the compound No. 6 described in the table attached to Example 5 in German Patent Specification No. 1,101,657.

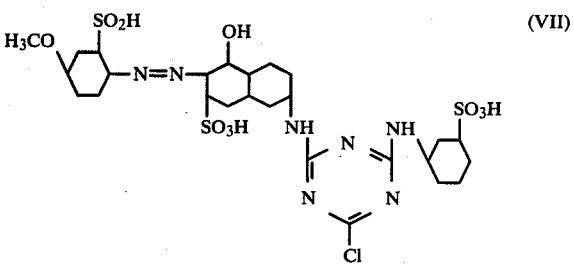
(VII)

Corresponding to II; described in German Pat. No. 1,101,657.

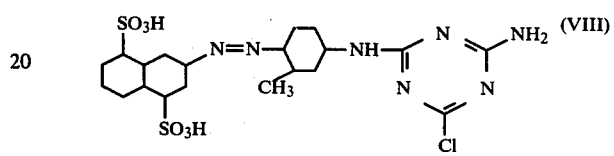
(VIII)

Corresponding to III; the compound No. 13 described in the Table 1 attached to Example 2 in British Patent Specification No. 869,279.

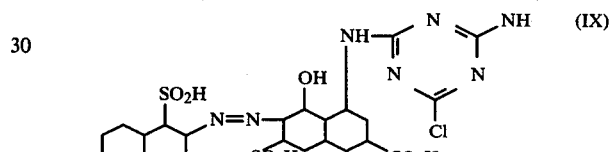
(IX)

Corresponding to IV; the compound described in Example 2 in British Patent Specification No. 899,376.

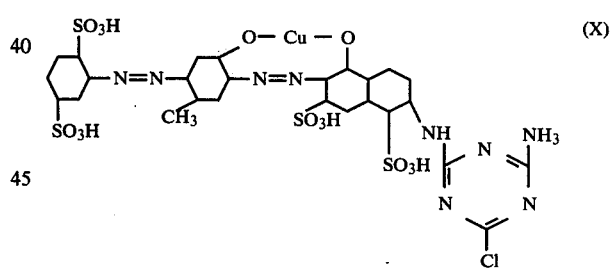
(X)

Corresponding to V: the compound No. 17 described in the table attached to Example 3 in German Patent Specification No. 1,156,914.

As shown in the above table, the dyes of the present invention can be applied to any cellulosic textile materials, for example cotton, hemp and regenerated cellulose, and show an extremely high fixing ratio particularly by a dipping process and a padding process, thus being of very high industrial value.

The present invention will be illustrated with reference to the following examples, which are only given for the purpose of illustration, and not to be interpreted as limiting.

EXAMPLE 1

100 parts of bleached cotton yarn was dyed at 75° C. for 1 hour in 3000 parts of a dye liquor containing 150 parts of sodium sulfate, 9 parts of trisodium phosphate and 4 parts of the dye which had been prepared by condensing 6-(4″,6″-dichlorotriazine-2″-yl) amino-2-(2′-sulfophenylazo)-1-naphthol-3-sulfonic acid with 1/3 by molar ratio of diethylenetriamine under the condition as described in Example 2. Thereafter the dyed yarn was taken out, rinsed in warm water, boiled for 5 minutes, rinsed in a 0.2% aqueous detergent solution and finally dried.

Thus, the yarn was dyed in a deep orange shade which was very fast to washing and sunlight.

EXAMPLE 2

The dye which was used in Example 1 was obtained as follows. The diazo compound obtained from 16.5 parts of aniline-2-sulfonic acid was coupled with the primary condensation product obtained from 18.5 parts of cyanuric chloride and 26.1 parts of sodium 6-amino-1-naphthol-3-sulfonate. After the coupling reaction was completed, the reaction solution was adjusted to about 7 of pH and then a solution of 3.5 parts of diethylenetriamine in 50 parts of water was added to the solution which was then heated to 40 to 45° C. and stirred at the same temperature for 3 hours. After the condensation reaction was completed, the solution was adjusted to about 6.5 of pH, salted out with sodium chloride, filtered and dried. In this example, replacement of 3.5 parts of diethylenetriamine by 3.6 parts of triethylenetetramine and 3.8 parts of tetraethylenepentamine could give similar dyes, respectively.

EXAMPLE 3

100 parts of bleached cotton yarn was dyed at 85° C. for 1 hour in 3000 parts of a dye liquor containing 150 parts of sodium chloride, 15 parts of sodium carbonate and 2 parts of the dye which had been prepared by condensing 1-amino-4-[4′-(4″,6″-dichlorotriazin-2″-yl)amino-anilino]-anthraquinone-2,3′-disulfonic acid with 1/3 by molar ratio of diethylenetriamine under the condition as described in Example 4. Thereafter the dyed yarn was rinsed as in Example 1. Thus, the yarn was dyed in a deep blue shade which was very fast to washing and sunlight.

EXAMPLE 4

The dye which was used in Example 3 was prepared as follows.

A solution of 18.5 parts of cyanuric chloride in 100 parts of acetone was poured into 500 parts of ice water to obtain an aqueous suspension of cyanuric chloride. To the suspension was added, at below 5° C. over 30 minutes, a solution of 53.3 parts of disodium 1-amino-4-(4′-aminoanilino)-anthraquinone-2,3′-disulfonate in 800 parts of water which was made slightly alkaline with sodium carbonate. The reaction mixture was further stirred for about 2 hours at 6 to 7 of pH to complete the condensation reaction. Then a solution of 3.5 parts of diethylenetriamine in 50 parts of water was added to the solution which was then kept at 40° to 45° C. for 2.5 hours while stirring. Then the solution was salted out with sodium chloride, filtered and dried.

A similar dye was also obtained even by condensing cyanuric chloride with, at first, diethylenetriamine and then the anthraquinone dye.

EXAMPLE 5

100 parts of bleached cotton yarn was dyed at 85° C. for 1 hour in 3000 parts of a dye liquor containing 150 parts of anhydrous sodium sulfate, 15 parts of sodium carbonate and 1 part of the dye which had been obtained by condensing a 1:1 copper complex of 6-amino-2-[4′-(2″,5″-disulfophenylazo)-2′-oxy-5′-methyl-phenylazo]-1-naphthol-3-sulfonic acid with cyanuric chloride and diethylenetriamine in this order under the condition as described in Example 6. Thereafter the dyed yarn was taken out, rinsed in warm water, boiled for 5 minutes, rinsed in a 0.2% aqueous detergent solution and finally dried.

Thus, the yarn was dyed in a deep blue shade which was fast to washing and sunlight.

EXAMPLE 6

The dye which was used in Example 5 was obtained as follows.

The diazo compound obtained from aniline-2,5-disulfonic acid was coupled with 1-amino-2-methoxy-5-methylbenzene to give the aminomonoazo compound. The resulting compound was further diazotized and coupled with 6-amino-1-naphthol-3-sulfonic acid under an alkaline condition. The aminodisazo dye thus obtained was converted into a copper complex by heating at 95° to 100° C. for 20 hours in a solution of copper sulfate in aqueous ammonia. 76.4 parts of trisodium salt of the resulting complex was dissolved in 1000 parts of water and added at 0° to 5° C. to a cyanuric chloride suspension which had been prepared by pouring a solution of 18.5 parts of cyanuric chloride in 100 parts of acetone into 500 parts of ice water. The resulting mixture was raised to 6.5 to 7.0 of pH with a sodium carbonate solution and maintained in this range while stirring by further adding the solution until pH change was no longer observed. Thereafter a solution of 3.5 parts of diethylenetriamine in 50 parts of water was added to the reaction solution which was then heated to 40° to 45° C. and maintained for about 2 hours while stirring. The solution was adjusted to near 6.5 of pH, salted out with sodium was adjusted to near 6.5 of pH, salted out with sodium chloride, filtered and dried at 40° to 50° C.

EXAMPLE 7

100 parts of a uniform printing paste was prepared by dissolving 2 parts of the dye used in Example 1 and 10 parts of urea in 30 parts of hot water and then adding thereto 55 parts of a 4% paste of sodium alginate (a medium-viscosity grade) and 3 parts of sodium bicarbonate.

Cotton broad cloth was printed with this printing color paste, dried and then steamed at 100° C. for 10 minutes followed by rinsing and soaping for finishing.

The printed fabric thus obtained was dyed in a deep orange shade which was highly fast to washing and sunlight.

EXAMPLE 8

Deep dyeings of excellent fastness were obtained using the dyes shown in the following table in the same manner as described in Examples 1, 3, 5 and 7. In the table, the shades on cellulosic textile materials are shown in the fouth column that were obtained with the dyes which had been prepared by condensing the dyes in the first column, halogenated triazines in the second column and compounds (polyamines) in the third column.

| No. | Dyestuff | Halogenated triazine | Polyamine | Shade |
|---|---|---|---|---|
| 1 | 6-Amino-2-(4'-methylphenylazo)-1-naphthol-2',3-sulfonic acid | Cyanuric chloride | Dipropylene triamine | Reddish orange |
| 2 | " | " | Triethylene tetramine | " |
| 3 | " | " | Tetraethylene pentamine | " |
| 4 | " | " | Pentaethylene hexamine | " |
| 5 | " | " | Hexaethylene heptamine | " |
| 6 | 6-Amino-2-(4'-chlorophenylazo)-1-naphthol-2',3-disulfonic acid | Cyanuric bromide | Diethylene triamine | Orange |
| 7 | 6-Amino-2-(4'-chloro-5'-methylphenylazo)-1-naphthol-2',3-disulfonic acid | Cyanuric chloride | " | " |
| 8 | 4-Amino-2-acethylamino-(1',5'-disulfo-naphthyl-2'-azo)-benzene | " | Tetraethylene pentamine | Yellow |
| 9 | 4-(4',8'-disulfonaphthyl-2'-azo)-3-methyl-aniline | " | Dipropylene triamine | " |
| 10 | 4-(4',8'-disulfonaphthyl-2'-azo)-2-methoxy-5-methylaniline | " | " | Reddish yellow |
| 11 | 4-(3',6',8'-trisulfonaphthyl-2'-azo)-3-ureidoaniline | Cyanuric chloride | Dipropylene triamine | Reddish yellow |
| 12 | 8-Amino-2-(2'-carboxyphenylazo)-1-naphthol-3,6-disulfonic acid | " | Triethylene tetramine | Red |
| 13 | 4-(4''-Amino-2''-sulfophenylazo)-1-(2'-methyl-5'-sulfophenyl)-3-methyl-5-pyrazolone | " | Diethylene triamine | Yellow |
| 14 | 4-(5''-Amino-2''-sulfophenylazo)-1-(2',5'-dichloro-4'-sulfophenyl)-3-methyl-5-pyrazolone | " | " | Greenish yellow |
| 15 | 4-(5''-Amino-2''-sulfophenylazo)-1-(4'-sulfophenyl)-3-methyl-5-pyrazolone | " | " | Yellow |
| 16 | 4-(5''-Amino-2''-sulfophenylazo)-1-(4'-sulfophenyl)-3-carboxy-5-pyrazolone | " | Pentaethylene hexamine | Reddish yellow |
| 17 | 4-(5''-Amino-2''-sulfophenylazo)-1-(4'-methoxy-2'-sulfophenyl)-3-methyl-5-pyrazolone | " | Triethylene tetramine | Greenish yellow |
| 18 | 8-Amino-7-(4-methoxyphenylazo)-1-naphthol-3,6-disulfonic acid | " | " | Red |
| 19 | 8-Methylamino-7-(2'-sulfophenylazo)-1-naphthol-3,6-disulfonic acid | Cyanuric bromide | Tetraethylene pentamine | Red |
| 20 | 8-Amino-2,7-bis(5'-amino-2'-sulfophenylazo)-1-naphthol-3,6-disulfonic acid | Cyanuric chloride | " | Greenish blue |
| 21 | 8-Amino-2,7-bis(4'-amino-2'-sulfophenylazo)-1-naphthol-3,6-disulfonic acid | " | Diethylene triamine | Dark green |
| 22 | 1,3-Dihydroxy-2-(2'-sulfo-4'-aminophenylazo)-4-(2''-hydroxy-5''-sulfophenylazo)-benzene | " | " | Brown |
| 23 | 1,3-Dihydroxy-2-(4''-amino-2',2''-disulfo-stilbene-4'-ylazo)-4-(2'''-hydroxy-5'''-sulfophenylazo)-benzene | " | " | " |
| 24 | 1-Amino-4-[4'-(2'',5'',7''-trisulfonaphthyl-1''-azo)-2',5'-dimethylphenylazo]-naphthalene-6-sulfonic acid | " | Hexaethylene heptamine | " |
| 25 | 6-N-butylamino-2-[4'-(2''-sulfophenylazo)-2'-hydroxy-5'-methylphenylazo]-1-naphthol-3-sulfonic acid | " | Pentaethylene hexamine | Blue |
| 26 | 1-(2'-Methyl-3'-amino-5'-sulfophenyl)-3-carboxy-4-[4''-(2'''-sulfophenylazo)-2''-methoxy-5''-methylphenylazo]-5-pyrazolone | Cyanuric chloride | Diethylene triamine | Red |
| 27 | 1-Amino-4-(4'-methylaminoanilino)-anthraquinone-2-sulfonic acid | " | Tetraethylene pentamine | Blue |
| 28 | 1-Amino-4-(3'-β-hydroxyethylaminoanilino)-anthraquinone-2,5-disulfonic acid | " | " | " |
| 29 | 1-Amino-4-(4' n-butylaminoanilino)-anthraquinone-2,3'-disulfonic acid | " | Diethylene triamine | Reddish blue |
| 30 | 1-Amino-4-[4'-(4''-aminophenylazo)-anilino]-anthraquinone-2,2',5-trisulfonic acid | " | " | Olive green |
| 31 | 1-Amino-4-(4'-aminoanilino)-anthraquinone-2,3',6-trisulfonic acid | " | " | Greenish blue |
| 32 | 1-Amino-4-(4'-amino-3'-carboxyanilino)-anthraquinone-2,5-disulfonic acid | " | Triethylene tetramine | " |
| 33 | 1-Amino-4-(3'-aminoanilino)-anthraquinone-2,4',5-trisulfonic acid | " | Diethylene triamine | Blue |
| 34 | 1-Amino-4-[4'-(4''-aminophenyl)-anilino]-anthraquinone-2,3'',5-trisulfonic acid | Cyanuric chloride | Diethylene triamine | Greenish blue |
| 35 | 1-Amino-4-(4'-methylaminoanilino)-anthraquinone-2,3',5-trisulfonic acid | " | Pentaethylene hexamine | Reddish blue |
| 36 | 1-Amino-4-(4'-ethylaminoanilino)-anthraquinone-2,3'-disulfonic acid | " | " | " |
| 37 | 1-Amino-4-(3'-amino-6'-methylanilino)-anthraquinone-2,4'-disulfonic acid | " | Diethylene triamine | " |
| 38 | 1-Amino-4-(3'-aminoanilino)-anthraquinone-2,4'-disulfonic acid | Cyanuric bromide | " | " |
| 39 | 1-Amino-4-(4'-aminoanilino)-anthraquinone-2,3',5-trisulfonic acid | " | Triethylene tetramine | Greenish blue |
| 40 | 1-Amino-4-(3'-aminoanilino)-anthraquinone-2,4',6-trisulfonic acid | " | " | Blue |

-continued

| No. | Dyestuff | Halogenated triazine | Polyamine | Shade |
| --- | --- | --- | --- | --- |
| 41 | 1-Amino-4-(3'-amino-2',4',6'-trimethyl-anilino)-anthraquinone-2,5'-disulfonic acid | Cyanuric chloride | " | Reddish blue |
| 42 | 1:1 Copper complex of 6-amino-2-(2'-hydroxy-3',5'-disulfophenylazo)-1-naphthol-3-sulfonic acid | Cyanuric chloride | Diethylene triamine | Violet |
| 43 | 1:2 Chromium complex of 6-amino-2-(2'-carboxyphenylazo)-1-naphthol-3-sulfonic acid | " | " brown | Reddish |
| 44 | 1:2 Cobalt complex of 6-amino-2-(2'-hydroxy-3'-sulfo-5'-nitrophenylazo)-1-naphthol-3-sulfonic acid | " | " | Brown |
| 45 | Nickel complex of 6-amino-2-[4'-(2",5"-disulfophenylazo)-2'-hydroxy-5'-methyl-phenylazo]-1-naphthol-3-sulfonic acid | " | " | Blue |
| 46 | 1:1 Copper complex of 8-amino-2-[4-(2",5"-disulfophenylazo)-2'-oxy-5'-methylphenylazo]-1-naphthol-3,6-disulfonic acid | " | Tetraethylene pentamine | " |
| 47 | 1:2 Cobalt complex of 6-amino-2-(2'-hydroxy-4'-sulfo-6'-nitronaphthyl-1'-azo)-1-naphthol-3-sulfonic acid | " | " | Violet brown |
| 48 | 1:2 Chromium complex of the above compound | Cyanuric chloride | Tetraethylene pentamine | Greenish grey |
| 49 | 1:1 Copper complex of 6-amino-2-(2'-hydroxy-5'-sulfophenylazo)-1-naphthol-3,5-disulfonic acid | " | Diethylene triamine | Ruby |
| 50 | 1:1 Copper complex of 6-amino-2-[4'-(4"-sulfophenylazo)-2'-hydroxy-5'-methyl-phenylazo]-1-naphthol-3-sulfonic acid | " | " | Navy |
| 51 | 1:1 Copper complex of 8-amino-2-[4'-(3",6",8"-trisulfonaphthyl-2"-azo)-2'-hydroxy-5'-methylphenylazo]-1-naphthol-3,6-disulfonic acid | " | " | Blue |
| 52 | 1:1 Copper complex of 8-amino-2-[4'-(6",8"-disulfonaphthyl-2"-azo)-2'-carboxyphenylazo]-1-naphthol-3,6-disulfonic acid | " | Triethylene tetramine | Violet |

EXAMPLE 9

100 parts of cotton fabric was added to a dye liquor containing 80 parts of sodium chloride, 80 parts of trisodium phosphate and 2 parts of monochlorotriazinyl phthalocyanine dye obtained in Example 10. Then the liquor was heated to 60° C. in 0.5 hour, and 80 parts of sodium chloride was added to the liquor which was then heated to 80° C. in 15 minutes and maintained at this temperature for 0.5 hour. The dyeings thus obtained were rinsed and soaped in a boiling 0.3% aqueous nonionic detergent solution for 15 minutes. The fabric was dyed in a very deep greenish blue shade which was very fast to washing and sunlight.

EXAMPLE 10

The dye which was used in Example 9 was obtained as follows.

60 parts of copper phthalocyanine was added to 720 parts by volume of chlorosulfonic acid, and the mixture was heated at 140 to 141° C. for 2 hours, cooled and stirred into ice water. The precipitated sulfochloride was filtered and washed thoroughly with ice water to obtain a wet cake. The wet cake of crude copper phthalocyanine sulfochloride thus obtained was slurried by thoroughly mixing with 300 parts of ice, and the mixture was adjusted, at 0 to 3° C., to 6.5 of pH with a dilute caustic soda solution. Into the slurry were rapidly stirred a solution of 15 parts of 1-amino-4-acetylaminobenzene in 580 parts of acetone, and 50 parts by volume of pyridine. The mixture was stirred at room temperature for 20 hours, steam distilled under an alkaline state to remove pyridine completely, and then made acid to Congo Red with a dilute hydrochloric acid to precipitate the dye. The filtered dye wet cake was heated at 100° C. for 1 hour in a solution of 50 to 60 parts of conc. sulfuric acid in 1250 parts of water and then filtered. The dye wet cake was dissolved in 1000 parts of hot water containing a small amount of alkali, and then the solution was steam distilled at 8.5 of pH until a volatile amine was no longer detected, made alkaline to Brilliant Yellow and salted out with sodium chloride to reprecipitate the dye. The product thus obtained was considered to be a sodium salt of copper phthalocyanine monosulfonyl-N-(p-aminophenyl)-amide-trisulfonic acid.

The salt was dissolved in 2000 parts of water and adjusted exactly to 7.0 of pH. The solution was condensed, at 0 to 4° C., with 18.5 parts of cyanuric chloride in a form of aqueous suspension which had been prepared by pouring its acetone solution into ice, while keeping pH of the reaction solution at 5 to 7.5 with 1N-aqueous caustic soda solution. After the reaction, the solution was further reacted with an aqueous solution of 3.5 parts of diethylenetriamine at 40 to 45° C. for 3 hours. Thereafter the solution was adjusted to about 6.5 of pH and salted out to precipitate the desired dye.

Alternatively, a dye of the similar quality was obtained by first condensing cyanuric chloride with diethylenetriamine, and then condensing the resulting compound with the above compound which was considered to be copper phthalocyanine-monosulfonyl-N-(p-aminophenyl)-amide-trisulfonic acid.

EXAMPLE 11

When the dye which was used in Example 9 was replaced by 2 parts of the dye prepared by the following process, brilliant blue dyeings of good fastness to washing and sunlight were obtained.

57.5 parts of copper phthalocyanine was added to 537 parts of chlorosulfonic acid while stirring at a temperature of below about 30° C. Then the mixture was stirred at room temperature for 30minutes, heated to from 130° to 133° C. over 1.5 hours and maintained at the same temperature for 4 hours. After the reaction was completed, the reaction solution was cooled and stirred into a mixture of 500 parts of water, 280 parts of sodium chloride and 3000 parts of crushed ice. The mixed solution was stirred for a short time, filtered and washed with a mixture of 600 parts by volume of saturated sodium chloride solution and 200 parts of ice to obtain crude copper phthalocyanine sulfochloride as an acidic wet cake. The sulfochloride was considered to be a mixture of copper phthalocyanine-,3''-trisulfochloride-3'''-monosulfonic acid and corresponding copper phthalocyanine-disulfochloridedisulfonic acid. The acidic wet cake of crude sulfochloride was slurried by thoroughly mixing with 300 parts of ice and adjusted, at 0° to 3° C., to 6.5 to 7.0 of pH with a cold, dilute aqueous caustic soda solution. The neutralized slurry was mixed with 5 parts of sodium carbonate and a solution of 14 parts of 4-aminoformylaniline in 500 parts of water, then immediately with 15 parts of sodium carbonate. The mixture was stirred at 20° to 23° C. for 24 hours, and acidified with hydrochloric acid to precipitate a dye acid which was then filtered. The filtered cake which was acidic to Congo Red was suspended in 1000 parts of water and hydrolyzed by adding 60 parts of conc. sulfuric acid in a dilute solution so that the total volume did not exceed 1500 parts by volume, and by heating the whole at 100° C. for 1 hour. After cooling, the mixture was filtered, and the wet cake was again suspended in water. The solution was made alkaline with an aqueous caustic soda solution, steam distilled to remove some volatile amines, adjusted to 7.5 of pH and then salted out with sodium chloride to obtain a dye.

The dye wet cake thus obtained was dissolved in 2000 parts of water, and the solution was adjusted exactly to pH 7.0 and condensed, at 0° to 4° C., with 18.5 parts of cyanuric chloride in a form of aqueous suspension which had been prepared by pouring its acetone solution into ice water. During the condensation the solution was kept at 5.0 to 7.5 of pH with 1N-aqueous caustic soda solution. After the reaction was completed, an aqueous solution containing 3.5 parts of diethylenetriamine was added to the cold solution, and the mixture was heated to 40° to 45° C., and kept at the same temperature for 3 hours. After the second condensation was completed, the solution was adjusted to about 6.5 of pH and salted out to obtain the desired dye.

EXAMPLE 12

One part of the dye which was used in Example 9 was dissolved in 100 parts of water. Cotton fabric was padded at 80° C. with the dye liquor, squeezed to 75% of pick-up on a padder and dried at room temperature. The dried fabric was then padded with a solution containing 10 g/l of caustic soda and 300 g/l of sodium chloride and squeezed to 75% of pick-up. The fabric was steamed at 100° to 101° C. for 1 minute, rinsed, treated with a 0.5% sodium carbonate solution, soaped in a boiling 0.3% nonionic detergent solution for 15 minutes, rinsed and dried.

The cotton fabric was dyed in a greenish blue shade of good fastness to washing and sunlight.

EXAMPLE 13

In the same manner as described in Example 12, deep green dyeings of good fastness was obtained by using 1 part of the dye prepared by the following process.

60 parts of copper pthalocyanine was added to 720 parts of chlorosulfonic acid, and the mixture was heated at 140° to 141° C. for 2 hours. Then the mixture was cooled and stirred into ice water to precipitate sulfochloride which was then filtered and washed thoroughly with ice water. Crude copper phthalocyanine sulfochloride thus obtained was slurried by thoroughly mixing with 300 parts of ice. The slurry was adjusted, at 0° to 3° C., to 7.5 of pH with a dilute caustic soda solution and then 30 parts of calcium carbonate and a solution of 21 parts of sodium 1,4-diaminobenzene-3- -sulfonate in 580 parts by volume of water were rapidly added thereto. The mixture was then stirred at room temperature for 20 to 24 hours and then made acidic to Congo Red at 35° to 40° C., with a diluted hydrochloric acid to precipitate a dye which was then filtered. The filtered dye cake was refined by dissolving it in water to make up to 1500 parts of total volume and making the solution acidic to Congo Red with hydrochloric acid to reprecipitate the dye. The filtered dye wet cake was again suspended in water, and the suspension was adjusted to 7 to 7.5 of pH. Then a solution of 18.5 parts of cyanuric chloride in 100 parts of acetone was added drowise thereto at 0° to 5° C., and the mixture was stirred for 2 hours, salted out and filtered. One half the phthalocyanine dye wet cake thus obtained and 130 parts of sodium salt of 4-[5''-(4'''-, 6'''-dichloro-triazin-2'''-yl) amino-2'' -sulfophenylazo]-1-(3'-sulfophenyl)-3-methyl-pyrazolone (5) were dissolved in 2000 parts of water, and then a solution of 9.5 parts of diethylenetriamine in 100 parts of water was added thereto. The mixture was heated to 40° to 45° C. and stirred at this temperature for 3 hours. After the reaction was completed, the reaction solution was adjusted to 6.5 of pH and salted out to precipitate the desired dye which was then filtered and dried.

EXAMPLE 14

When the dye which was used in Example 12 was replaced by 1 part of the dye obtained by the following process, brilliant blue dyeings of excellent fastness were obtained.

The crude copper phthalocyanine sulfochloride wet cake which had been obtained in Example 10 was slurried by thoroughly mixing with 300 parts of ice. The slurry was adjusted, at 0° to 3° C., to 6.5 to 7.0 of pH with a diluted caustic soda solution. Then the neutralized slurry was mixed with 2.5 parts by volume of a solution of 20 parts of calcined sodium carbonate in 100 parts of water. After stirring for a short time, the mixture was immediately added to the primary condensation reaction mass prepared from 0.1 mole of cyanuric chloride and 0.02 mole of tetraethylenepentamine in 1200 parts of water. The whole was heated to 40 to 45° C. and kept at this temperature for 3 hours while stirring. After the reaction was completed, the solution was adjusted to near 6.5 of pH and salted out to precipitate the desired dye.

EXAMPLE 15

A solution of 18.5 parts of cyanuric chloride in 100 parts of acetone was poured into 500 parts of ice water to obtain an aqueous suspension of cyanuric chloride. To the suspension thus obtained was added, at below 5° C. over 1 hour, the solution of 34.1 parts of 8-amino-1-naphthol-3,6-disulfonic acid monosodium salt in 400 parts of water which had been made slightly alkaline with 2N-aqueous caustic soda. The mixture was kept at the same temperature for 2 hours and then adjusted to 6 to 7 of pH with 2N-aqueous sodium carbonate to complete the condensation reaction.

Thereafter a solution of 5.2 parts of diethylenetriamine in 50 parts of water was added thereto, and the mixture was kept at 35° to 40° C. for 3 hours. After the second condensation was completed, the reaction solution was cooled to below 5° C. and coupled with a diazo compound obtained from 22.0 parts of 2-naphthylamine-1-sulfonic acid. The solution was adjusted to about 6.5 of pH and salted out with sodium chloride to precipitate the desired monoazodye which was then filtered and dried at 40° to 50° C.

The dye thus obtained gave brilliant bluish red dyeings of good fastness to sunlight in the same manner as described in Example 1.

Example 16

A solution of 18.5 parts of cyanuric chloride in 100 parts in acetone was poured into 500 parts of ice water to obtain an aqueous suspension of cyanuric chloride. To the suspension was added a solution of 5.2 parts of diethylenetriamine in 50 parts of water and the mixture was stirred for 3 hours. Then a solution of 18.8 parts of 2,4-diaminobenzene-1-sulfonic acid in 300 parts of water was added thereto, and the mixture was heated to 30° to 35° C. and allowed to react at the same temperature while keeping pH at 6 to 7 with 2N-aqueous sodium carbonate. After the condensation was completed, the solution was cooled to below 5° C., diazotised by well-known methods and coupled with 1-(2',5'-disulfophenyl)-3-methylpyrazolone. The reaction solution was adjusted to about 6.5 of pH and salted out with sodium chloride to precipitate the desired dye which was filtered and dried.

The dye thus obtained gave deep greenish yellow dyeings of good fastness to sunlight in the same manner as described in Example 2.

EXAMPLE 17

100 parts of bleached plain weave cotton fabric was padded at room temperature with a 1% aqueous sodium carbonate solution squeezed to 200% of pick-up between rollers and dried at 100° C. Then the fabric was padded with a 2% aqueous solution of the dye obtained in Example 2, squeezed to 200% of pick-up and then steamed at 110° C. for 5 minutes. The dyed fabric was thoroughly rinsed in water and then in a dilute sodium bicarbonate solution, soaped at the boil, rinsed and finally dried. The fabric was dyed in a deep orange shade which was fast to washing and sunlight.

EXAMPLE 18

100 parts of bleached plain weave cotton fabric was padded at room temperature with a dye liquor containing 1% of sodium bicarbonate, 0.2% of a highly sulfonated oil and 2% of the dye obtained in Example 4, squeezed between rollers to 200% of pick-up. After dried in a hot flue drier, the fabric was rinsed successively in water and boiling soap solution, rinsed and finally dried. The fabric was dyed in a deep blue shade which was fast to washing and sunlight.

Example 19

100 parts of bleached plain weave cotton fabric was padded at room tempertaure with a 1% aqueous sodium carbonate solution, squeezed to 200% of pick-up between rollers and dried at 100° C. The fabric was then padded with a 2% aqueous solution of the dye obtained in Example 6, squeezed to 200% of pick-up between rollers and steamed at 100° C. for 5 minutes. The dyed fabric was thoroughly rinsed successively in water and a dilute sodium bicarbonate solution, soaped at the boil, rinsed and finally dried. The fabric was dyed in a deep blue shade which was fast to washing and sunlight.

EXAMPLE 20

A solution of 6.1 parts of disodium 6-(4'',6''-dichlorotriazin-2''-yl)amino-2-(2'-sulfophenylazo)-1-naphtholsulfonate (hereinafter referred to as dye 1) in 100 parts of water was mixed with a solution of 1.9 parts of tetraethylenepentamine in 30 parts of water, which amine solution had been adjusted to pH 5, and the mixture was allowed to react at 25° to 30° C. at pH 3 to 5. After the reaction was over, a solution of 6.4 parts of disodium 4-[4''-(4''',6'''-dichlorotriazin-2-yl)amino-2''-sulfophenylazo]-1-(3'-sulfophenyl)-3-methyl-pyrazolone (hereinafter referred to as dye 2) in 100 parts of water was added to the above reaction mixture, and the mixture was allowed to react at 30° to 35° C. at pH 5 to 6. After the reaction was over, a solution of 27.9 parts of a 1:1 copper complex of trisodium 6-(4''',6'''-dichlorotriazin-2'''-yl)amino-2-[4'-(2'',5''-disulfophenylazo)-2'-oxy-5'-methylphenylazo]-1-naphthol-3-sulfonate (hereinafter referred to as dye 3) was further added to the above reaction mixture, and the mixture was allowed to react at 40° to 45° C., while the pH being kept at 6 to 7, if necessary, using a 2N-sodium carbonate solution. After the reaction was over, the resulting solution was adjusted to pH 6.5 (This reaction mixture is hereinafter referred to as a dye liquor 1).

On the other hand, to a solution of 12.8 parts of the said dye 2 in 200 parts of water was added a solution of 1.9 parts of tetraethylenepentamine in 30 parts of water, and the mixture was allowed to react at 30° to 35° C. for about 3 hours. After the reaction was over, a solution of 27.9 parts of the said dye 3 in 300 parts of water was added to the above reaction mixture, and the mixture was allowed to react at 40° to 45° C. for 10 to 12 hours, while the pH being kept at 6 to 7, if desired, using a 2N-sodium carbonate solution. After the reaction mixture was adjusted to pH 6.5 (This reaction mixture is hereinafter referred to as a dye liquor 2).

A mixture of the said dye liquor 1 and dye liquor 2 was spray-dried. The resulting dye was used according to the same was as in Example 3 to obtain a dark black dyeing with good light fastness.

EXAMPLE 21

A solution of 6.1 parts of disodium 6-(4'',6''-dichlorotriazin-2''-yl)amino-2-(2'-sulfophenylazo)-1-naphthol-3-sulfonate, which solution had been adjusted to pH about 5, was added over about 30 minutes to a solution of 2.4 parts of pentaethylenehexamine in 30 parts of water, which amine solution was kept at 25° to 30° C. and pH about 5 using hydrochloric acid. The reaction mixture was kept at said temperature for about 3 hours while being kept at pH 3 to 5. Successively, a solution of 6.1 parts of 1-(4',6'-dichlorotriazin-2'-yl)amino-3-methyl-4-(4'',8''-disulfonaphthyl-2''-azo) benzene in 100 parts of water was added to the above reaction mixture, and the mixture was allowed to react at 30° to 35° C. for about 5 hours while being kept at pH 5 to 6. After the reaction was over, a solution of a 1:1 copper complex of trisodium 6-(4''',6'''-dichlorotriazin-2'''-yl)amino-2-[4'-(2'',5''-disulfophenylazo)-2'-oxy-5'-methylphenylazo]-1- naphthol-3-sulfonate was further added to the above reaction mixture, and the mixture was allowed to react at 40° to 45° C. for 10 to 12 hours while being kept at pH 6 to 7. After the reaction was over, the resulting reaction mixture was adjusted to pH 6.5 and spray-dried.

The dye obtained was used according to the same manner as in Example 3 to obtain a dark greenish black dyeing with good light fastness.

What is claimed is:

1. A compound of the formula

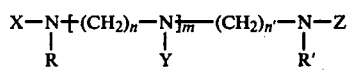

wherein
R and R' each are hydrogen, $C_1$–$C_4$ alkyl or $C_1$–$C_4$ hydroxyalkyl,
m is an integer from 1 to 6,
n and n' are each an integer from 2 to 4, and when m is 2 or more, n may be the same or different between 2 and 4,
X is hydrogen or a group of the formula

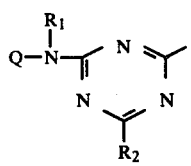

Y is hydrogen or a group of the formula

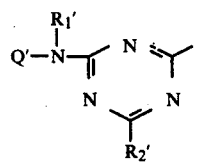

and
Z is hydrogen or a group of the formula

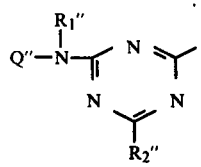

wherein
$R_1$, $R_1'$, and $R_1''$ each are hydrogen or $C_1$–$C_4$ alkyl,
$R_2$, $R_2'$, and $R_2''$ each are halogen, and
Q, Q', and Q'' each are dye residues and are independently one member selected from the group consisting of members of the formulae as a free acid form

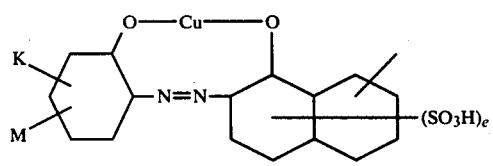

K and M are each hydrogen, halogen, methyl, methoxy, ethoxy, carboxyl, sulfo or aryl azo group, and e is 1 or 2,

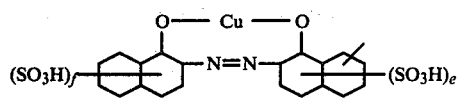

wherein
e is the same as defined above and
f is an integer of 1 to 3,

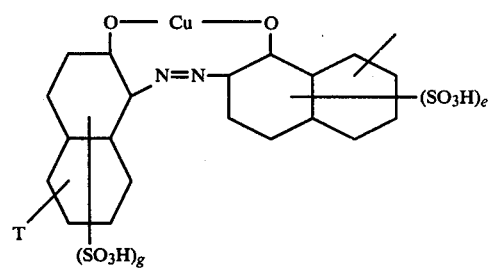

wherein
e is the same as defined above,
T is hydrogen, halogen or nitro, and
g is 0, 1 or 2, and

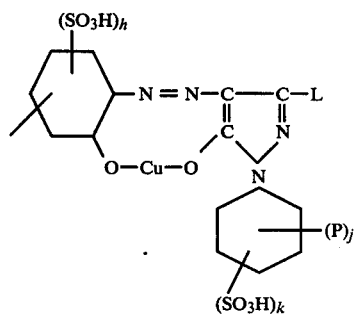

wherein
L is methyl, carboxyl, carboalkoxy or carbamide,
P is halogen, methyl, sulfo or sulfoamido, and
h, k and j are each 0, 1, or 2, with the proviso that h and k are not 0 at the same time,
with the proviso that X, Y, and Z are not hydrogen at the same time.

2. The compound of claim 1 wherein Q, Q', and Q'' are the same dye residue of the formula represented by

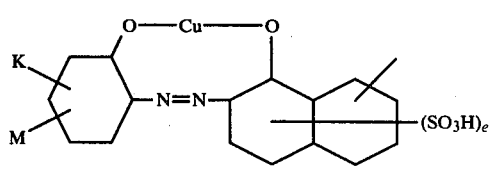

3. The compound of claim 1 wherein Q, Q', and Q'' are the same dye residue of the formula represented by

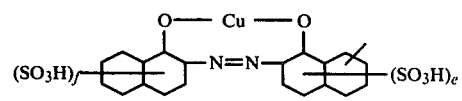

4. The compound of claim 1 wherein Q, Q', and Q" are the same dye residue of the formula represented by
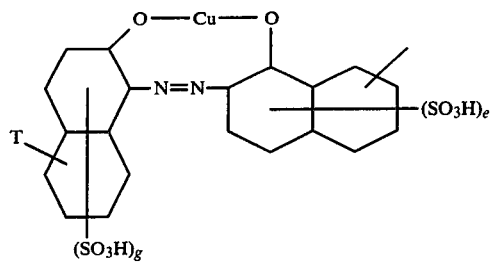
5. The compound of claim 1 wherein Q, Q', and Q" are the same dye residue of the formula represented by
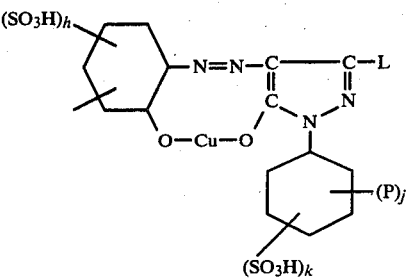
6. The compound of claim 1 wherein m is 1, 2, or 3 and n and n' are 2.
* * * * *